Patented Dec. 13, 1932

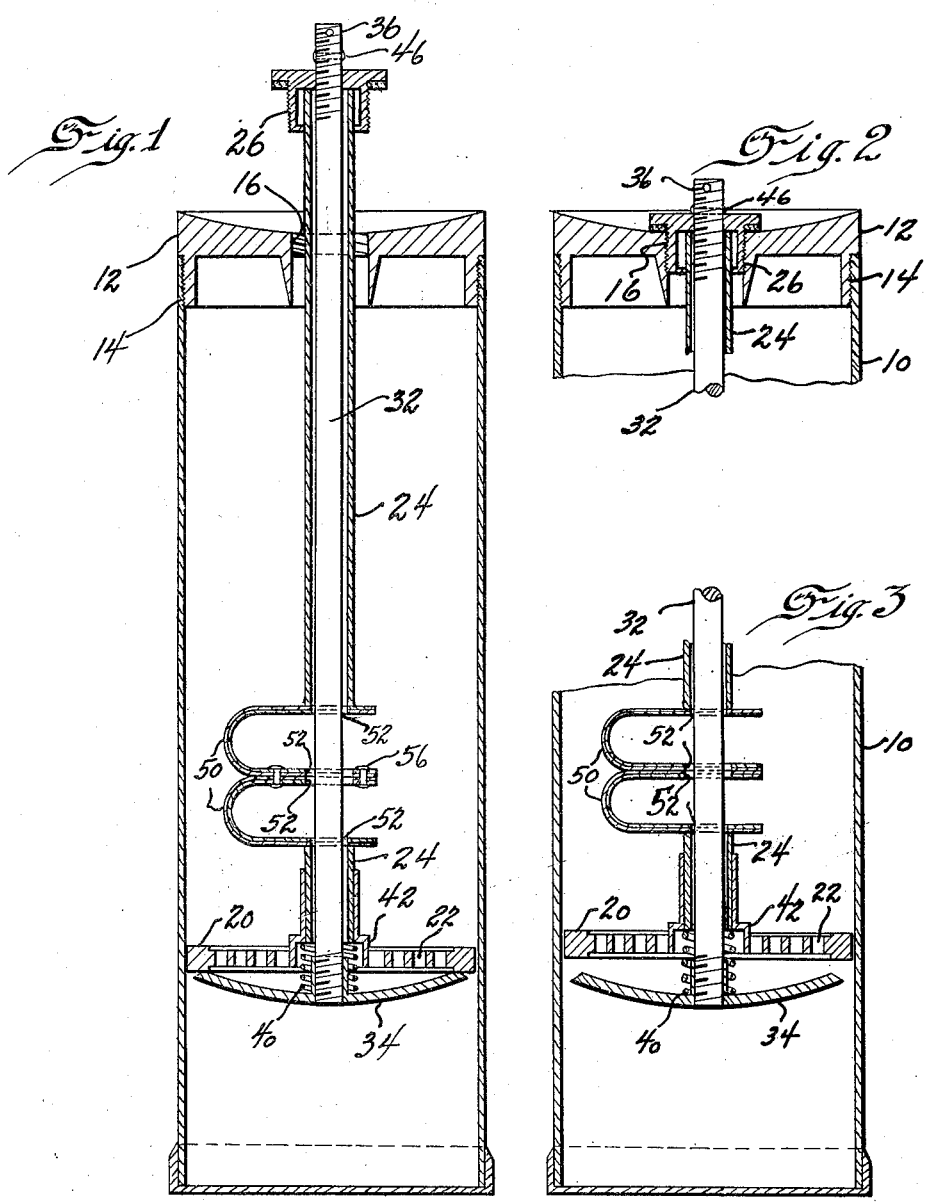

1,890,580

UNITED STATES PATENT OFFICE

LEONARD O. KELLEY, OF DETROIT, MICHIGAN, ASSIGNOR TO THE STANDARD COMPUTING SCALE COMPANY, OF DETROIT, MICHIGAN, A CORPORATION OF MICHIGAN

DASHPOT FOR SCALES

Application filed April 13, 1931. Serial No. 529,748.

This invention relates to dashpots and more particularly to dashpots used in conjunction with scales.

An object of this invention is a dashpot including a casing and a piston reciprocating therein, and means to lock the piston with respect to the casing when the device is to be shipped, or whenever desired.

A further object is a dashpot whose piston is provided with a valve which controls the rate of flow of oil in the dashpot as the piston reciprocates, there being an adjustable connection between the piston and valve which permits of the rate of flow being varied, as desired.

A further object is a device of the character above described wherein a thermally responsive element forms part of the piston and valve assembly and serves to vary the effective size of the passages thru which oil or any other liquid may flow in response to thermal conditions within the casing of the dashpot.

Still further objects will readily occur to those skilled in the art upon reference to the following description and the accompanying drawing in which Fig. 1 shows the dashpot in section.

Fig. 2 is a section view of the upper end of the dashpot, showing the parts locked for shipment.

Fig. 3 is a section view of the lower part of the dashpot showing the parts in the potion they occupy at relatively low temperatures and also showing a slight modification of the structure.

Referring to the drawing, it will be seen that the dashpot includes a casing 10 adapted to be secured to a scale part or to a scale frame, as desired, and having an upper end plate 12 connected thereto by threads 14 and provided with a threaded aperture 16 as shown.

Disposed within the casing is a piston and valve unit adapted to be connected to a scale part and adapted to be reciprocated in the dashpot casing 10 in a well known manner. The piston and valve unit includes a piston 20 having apertures 22 therein thru which may flow varying amounts of the oil with which the casing is partially filled, the piston being clear of the inner wall of the casing so that a portion of the oil can flow in the clearance between these parts.

This piston rod is in the form of a hollow tube 24 fixedly connected at one end to the piston and at the other end, it is surmounted by a nut 26.

Telescoped within the hollow piston rod 24 is a valve stem or rod 32 threadedly connected at its lower end to a plate valve 34 whose edge is adapted to engage the under side of the rim of the piston 20 and shut off the flow of oil thru the apertures 22. The upper end of the valve stem or rod 32 is threaded, as at 36 to provide means for attaching the piston and valve assembly to a suitable moving element and to engage cooperating threads in the interior of the hollow nut 26, these threads effecting an adjustable connection between the valve and the piston. The nut is also in effect swivelled on the tube 24, since it rotates thereon and moves longitudinally to a limited extent.

A coiled compression spring 40 surrounds the lower end of the valve rod 32 and is telescoped within a boss 42 formed as part of the connection between the piston rod 24 and the piston 20, the coil spring serving to space the valve 34 away from the piston 20 as much as is permitted by the threaded connection at the upper ends of the rods. A headed pin 46 on the valve rod, disposed above the nut 26, prevents relative separation of the valve and piston parts, except the slight separation on adjustment or under circumstances described below and also acts as a stop to prevent affecting the adjusted movement of nut 26 by the means attaching the device to a moving element.

The dashpot functions in the following manner. As the piston and valve unit reciprocate in the dashpot casing, oil flows around the piston and also thru the apertures 22 as much as is permitted by the position of the valve 34. The rate of flow thru these apertures 22 may be controlled by separating the piston and the valve as much as is desired, the control being effected thru the hollow nut 26.

When it is desired to lock the piston and valve unit in the casing, for purposes of shipment, etc., the piston and valve unit is projected down into the casing and the hollow externally threaded nut 26, is threaded into the threaded aperture 16 of the end plate, the parts thus being locked.

The construction thus far described presents one important objection and the same has been obviated in the following manner:

It is obvious that at low temperature the oil in the dashpot will not flow readily and will offer too much resistance to the movement of the piston. Accordingly, some means must be provided to expose the openings 22 to a greater extent in cold weather than in warm weather, or to a greater extent when the oil is more viscous than when it is less viscous. Such means should not disturb the preliminary adjustment of the parts and should be thermostatically controlled so as to require no observation or manual adjustment.

A means for this purpose has been provided and includes one or more bimetallic curved or U-shaped strips 50 having apertures 52 in the legs of the U's. The hollow rod or tube 24 is separated and the adjacent ends of the separated portions are disposed adjacent the apertures 52 and operatively, tho not necessarily actively connected to opposite sides of the curved bimetallic strips. If two or more strips are used they may be secured to each other by pins such as those shown at 56, if desired, although the strips may be unsecured to each other, if also desired.

When oil in the casing is at a relatively high temperature, the curved strip expands and the piston is moved close to the valve 34, the latter then engaging the rim 20 of the piston and preventing the flow of oil thru the apertures 22. When the oil is at a relatively low temperature, the parts will assume the position of Fig. 3, i. e., the curved strips 50 will contract, permitting the piston to be moved by spring 40 away from the valve and exposing the apertures 22 so that oil can flow therethru. At intermediate temperatures, the position of the piston with respect to the valve will vary and the degree of opening of the aperture and the rate of flow of oil therethru will thus be varied in accordance with the temperature.

While in the device disclosed the outermost of the tubes is connected to the piston and the innermost to the valve, conditions may be reversed and the part 34 may form the piston while the part 20 may be considered as the valve.

Further, while the rods are shown as telescoped with respect to each other, they may be separated and a connection between them of an entirely different character may be provided without departing from the spirit of the invention.

Now having described the invention and the preferred embodiment thereof, it is to be understood that the said invention is to be limited, not to the specific details herein set forth but only by the scope of the claims which follow:

What I claim is:

1. An oil containing dashpot including a casing having an apertured end, a valve in said casing and having a rod projecting thru said apertured end, an apertured piston in said casing and having a piston rod projecting thru said apertured end, the rods being connected to each other by means which permits their relative adjustment so that the valve can be moved to control the flow of oil thru the apertures of the piston, and a thermostat forming an operative part of one of the rods for lengthening or shortening the latter so as to subject the flow of oil thru the apertures to thermostatic control, said thermostat comprising a curved bimetallic strip having ends adjacent which and in operative connection with which rod portions are disposed.

2. An oil containing dashpot including a casing having an apertured end, a valve in said casing and having a rod projecting thru said apertured end, an apertured piston in said casing and having a piston rod projecting thru said apertured end, the rods being connected to each other by means which permits their relative adjustment so that the valve can be moved to control the flow of oil thru the apertures of the piston, and a thermostat forming an operative part of one of the rods for lengthening or shortening the latter so as to subject the flow of oil thru the apertures to thermostatic control, one of said rods being hollow and encompassing the other, said thermostat comprising a curved bimetallic strip having ends adjacent which and in operative connection with which rod portions are disposed.

3. An oil containing dashpot including a casing having an apertured end, a valve in said casing and having a rod projecting thru said apertured end, an apertured piston in said casing and having a piston rod projecting thru said apertured end, the rods being connected to each other by means which permits their relative adjustment so that the valve can be moved to control the flow of oil thru the apertures of the piston, and a thermostat forming an operative part of one of the rods for lengthening or shortening the latter so as to subject the flow of oil thru the apertures to thermostatic control, one of said rods being hollow and encompassing the other, the thermostat being operatively connected to the hollow rod, said thermostat comprising a curved bimetallic strip having ends adjacent which and in operative connection with which rod portions are disposed.

4. An oil containing dashpot including a casing having an apertured end, a valve in said casing and having a rod projecting thru said apertured end, an apertured piston in said casing and having a piston rod projecting thru said apertured end, the rods being connected to each other by means which permits their relative adjustment so that the valve can be moved to control the flow of oil thru the apertures of the piston, and a thermostat forming an operative part of one of the rods for lengthening or shortening the latter so as to subject the flow of oil thru the apertures to thermostatic control, there being a spring on the valve for relatively moving the latter to its outermost position, as much as is permitted by the adjustable connecting means on the rods, said thermostat comprising a curved bimetallic strip having ends adjacent which and in operative connection with which rod portions are disposed.

5. An oil containing dashpot including a casing having an apertured end, a valve in said casing and having a rod projecting thru said apertured end, an apertured piston in said casing and having a piston rod projecting thru said apertured end, the rods being connected to each other by means which permits their relative adjustment so that the valve can be moved to control the flow of oil thru the apertures of the piston, and a thermostat forming an operative part of one of the rods for lengthening or shortening the latter so as to subject the flow of oil thru the apertures to thermostatic control, there being a spring on the valve for relatively moving the latter to its outermost position, as much as is permitted by the adjustable connecting means on the rods and by the thermostat, said thermostat comprising a curved bimetallic strip having ends adjacent which and in operative connection with which rod portions are disposed.

6. A dashpot having an apertured end plate, a piston and a valve therefor having relatively telescoped rods projecting thru the apertured end plate, and means connecting the rods to each other, said means including a nut threadedly connected to the innermost rod and swivelly connected to the outermost rod, the outermost rod being provided with a bimetallic portion whereby the length of the rod may vary in response to the temperature.

In testimony whereof, I sign this specification.

LEONARD O. KELLEY.